(12) United States Patent
    Anshu

(10) Patent No.: US 10,868,413 B1
(45) Date of Patent: Dec. 15, 2020

(54) DEPTH-ADJUSTING ELECTRICAL BOX

(71) Applicant: Tilahun Anshu, Lowell, MA (US)

(72) Inventor: Tilahun Anshu, Lowell, MA (US)

( * ) Notice: Subject to any disclaimer, the term of this patent is extended or adjusted under 35 U.S.C. 154(b) by 0 days.

(21) Appl. No.: 16/835,765

(22) Filed: Mar. 31, 2020

(51) Int. Cl.
    H02G 3/16    (2006.01)
    H02G 3/12    (2006.01)
    H02G 3/08    (2006.01)
    F16M 13/02   (2006.01)
    H01R 13/73   (2006.01)

(52) U.S. Cl.
    CPC .......... H02G 3/081 (2013.01); F16M 13/022 (2013.01); H01R 13/73 (2013.01); H02G 3/126 (2013.01); H02G 3/16 (2013.01)

(58) Field of Classification Search
    CPC .............................. H02G 3/126; H01R 13/745
    See application file for complete search history.

(56) References Cited

U.S. PATENT DOCUMENTS

| | | | | |
|---|---|---|---|---|
| 2,684,220 | A * | 7/1954 | Beber | F21V 21/04 248/27.1 |
| 2,917,199 | A * | 12/1959 | Appleton | H02G 3/121 220/3.7 |
| 4,180,226 | A * | 12/1979 | Matte | H02G 3/123 248/27.1 |
| 7,087,837 | B1 * | 8/2006 | Gretz | H02G 3/121 174/53 |
| 7,285,722 | B2 * | 10/2007 | Shyr | F16B 5/0291 174/481 |
| 7,462,775 | B1 * | 12/2008 | Gretz | H02G 3/12 174/50 |
| 8,253,017 | B1 * | 8/2012 | Cleghorn | H02G 3/086 174/50 |
| 8,575,484 | B1 * | 11/2013 | Witherbee | H02G 3/14 174/58 |
| 9,270,099 | B1 * | 2/2016 | Anshu | H02G 3/10 |
| 10,447,019 | B2 * | 10/2019 | Ediger | H02G 3/126 |
| 2010/0252552 | A1 * | 10/2010 | Nikayin | H02G 3/123 220/3.7 |
| 2010/0288554 | A1 * | 11/2010 | Jafari | H02G 3/126 174/545 |
| 2015/0200061 | A1 * | 7/2015 | de Peralta | H02G 3/14 200/297 |

* cited by examiner

Primary Examiner — Hung V Ngo
(74) Attorney, Agent, or Firm — Kyle A. Fletcher, Esq.

(57) ABSTRACT

The depth-adjusting electrical box comprises an electrical box and one or more mounting brackets. The electrical box may be mounted to a stud via an individual mounting bracket selected from the one or more mounting brackets. The electrical box may be mounted at a mounting depth that is selected from a plurality of mounting depths. The mounting depth may be established by the selection of the individual mounting bracket, by the orientation of the individual mounting bracket, by the selection of which of a plurality of mounting apertures on the electrical box are used to couple the electrical box to the individual mounting bracket, or by combinations thereof. The mounting depth may be selected to compensate for the thickness of coverings placed over the studs.

18 Claims, 9 Drawing Sheets

DEPTH-ADJUSTING ELECTRICAL BOX

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electrical wiring, more specifically, a depth-adjusting electrical box.

SUMMARY OF INVENTION

The depth-adjusting electrical box comprises an electrical box and one or more mounting brackets. The electrical box may be mounted to a stud via an individual mounting bracket selected from the one or more mounting brackets. The electrical box may be mounted at a mounting depth that is selected from a plurality of mounting depths. The mounting depth may be established by the selection of the individual mounting bracket, by the orientation of the individual mounting bracket, by the selection of which of a plurality of mounting apertures on the electrical box are used to couple the electrical box to the individual mounting bracket, or by combinations thereof. The mounting depth may be selected to compensate for the thickness of coverings placed over the studs.

An object of the invention is to couple an electrical box to a stud.

Another object of the invention is to provide a variable mounting depth for the electrical box relative to the front of the stud A further object of the invention is to provide an L-bracket that may be operable to couple the electrical box to the stud using one of two orientations of the L-bracket.

Yet another object of the invention is to provide a U-bracket that may be operable to couple the electrical box to the stud.

These together with additional objects, features and advantages of the depth-adjusting electrical box will be readily apparent to those of ordinary skill in the art upon reading the following detailed description of the presently preferred, but nonetheless illustrative, embodiments when taken in conjunction with the accompanying drawings.

In this respect, before explaining the current embodiments of the depth-adjusting electrical box in detail, it is to be understood that the depth-adjusting electrical box is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the depth-adjusting electrical box.

It is therefore important that the claims be regarded as including such equivalent construction insofar as they do not depart from the spirit and scope of the depth-adjusting electrical box. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
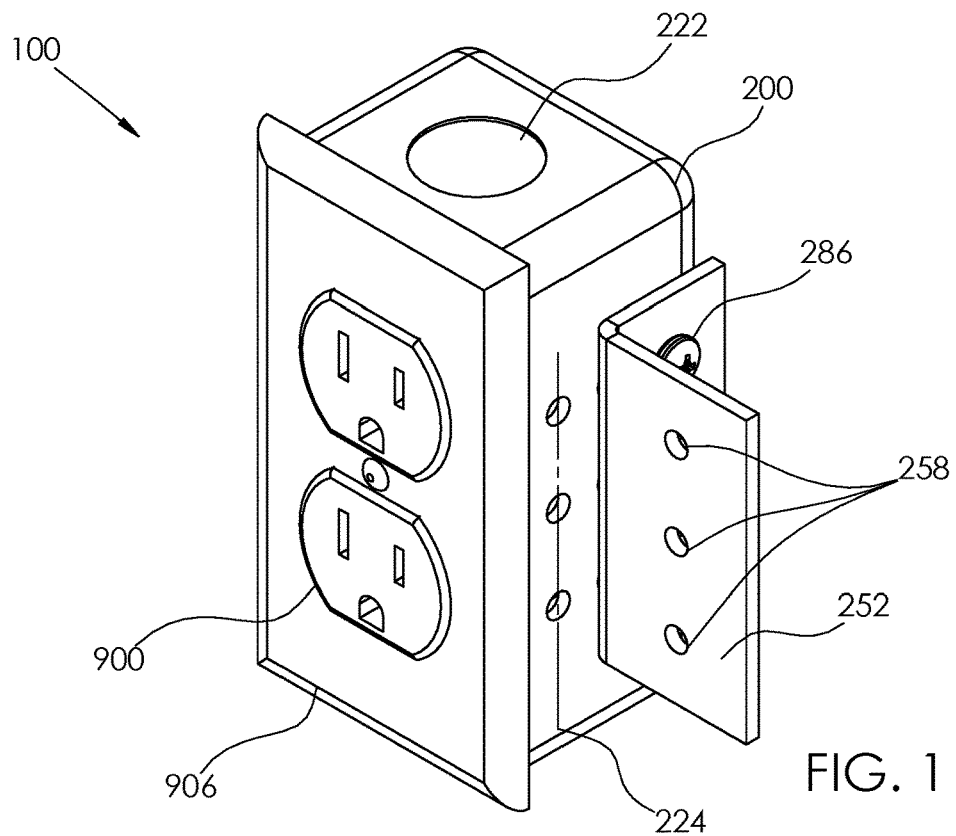
FIG. 1 is an isometric view of an embodiment of the disclosure illustrating a box with an L-bracket in a first orientation coupled to the third column of mounting apertures.
Figure 2:
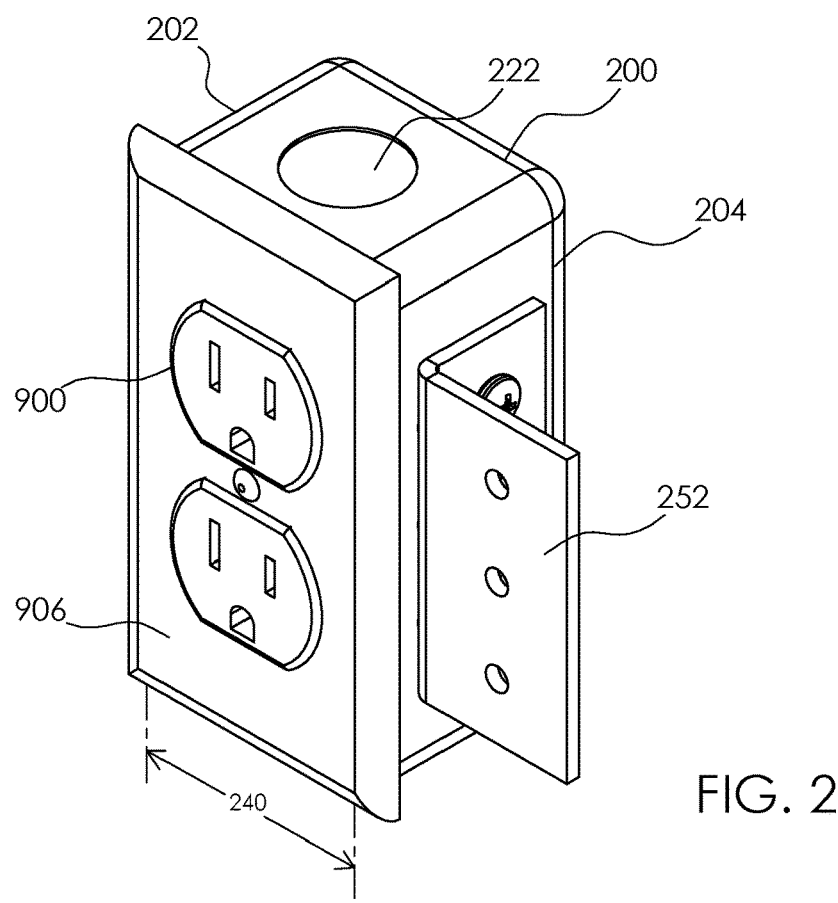
FIG. 2 is an isometric view of an embodiment of the disclosure illustrating a box with an L-bracket in a first orientation coupled to the first column of mounting apertures.
Figure 3:
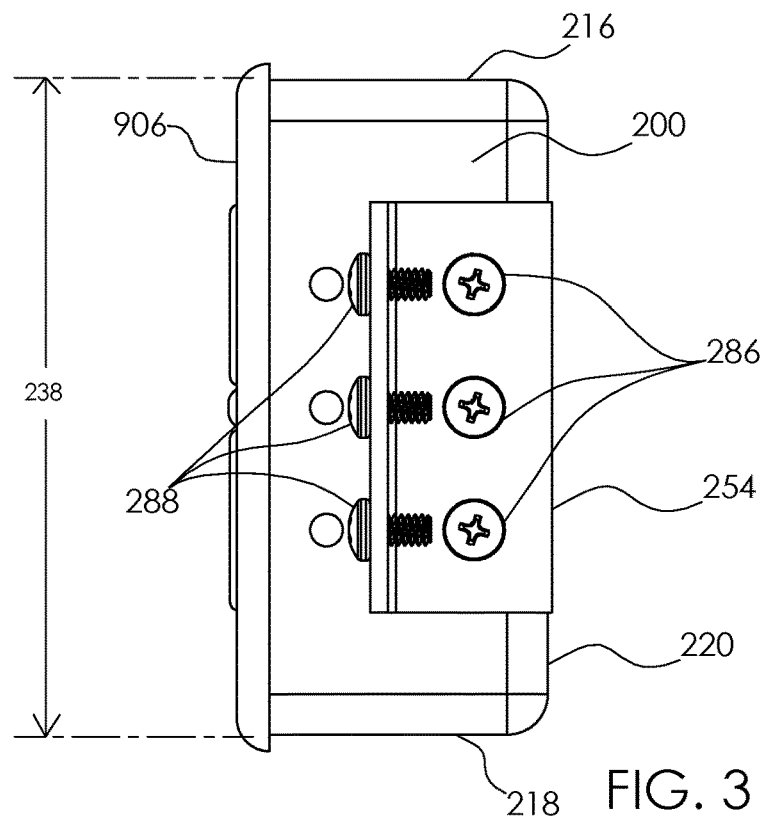
FIG. 3 is a side view of an embodiment of the disclosure illustrating a box with an L-bracket in a first orientation coupled to the third column of mounting apertures.
Figure 4:
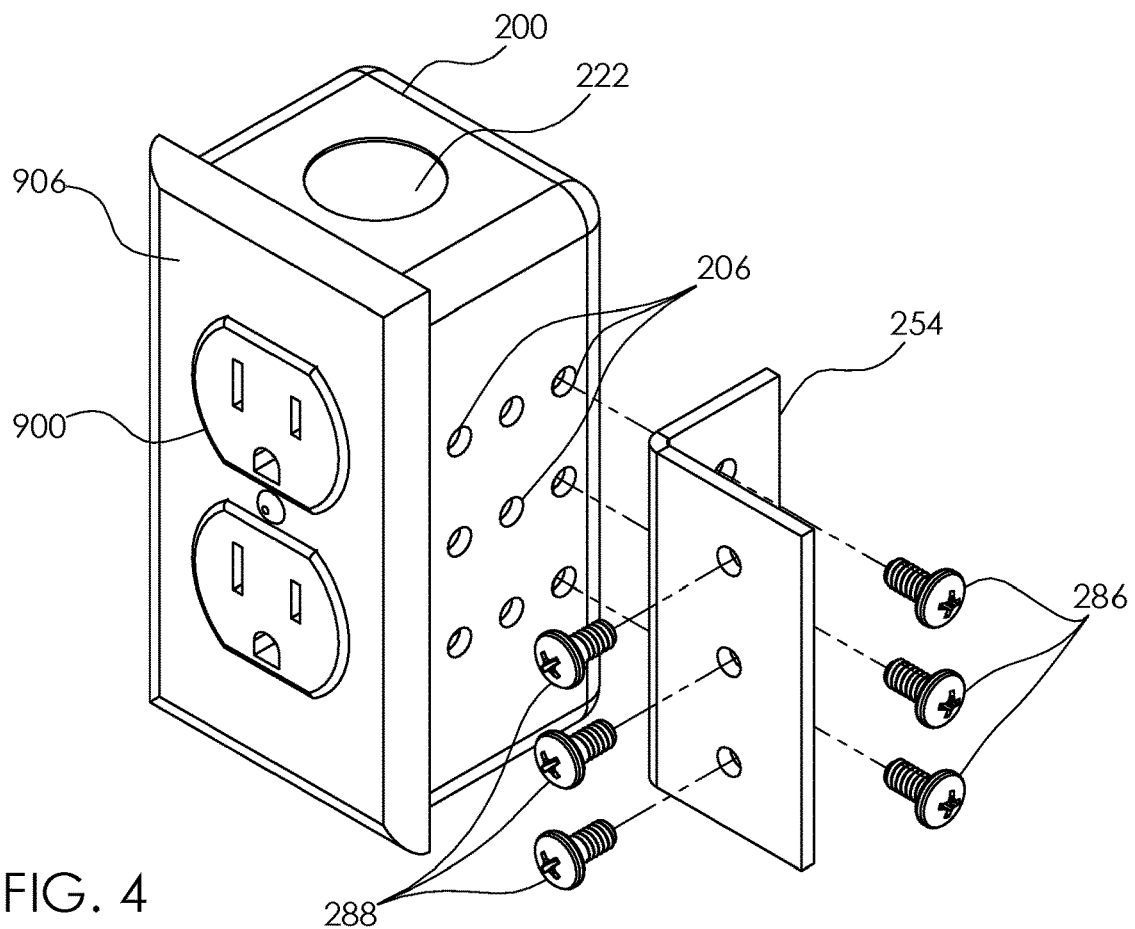
FIG. 4 is an exploded view of an embodiment of the disclosure illustrating a box with an L-bracket in a first orientation coupled to the third column of mounting apertures.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 14.

The depth-adjusting electrical box 100 (hereinafter invention) comprises an electrical box 200 and one or more mounting brackets. The electrical box 200 may be mounted to a stud 910 via an individual mounting bracket 252 selected from the one or more mounting brackets. The electrical box 200 may be mounted at a mounting depth 290 that is selected from a plurality of mounting depths. The mounting depth 290 may be established by the selection of the individual mounting bracket 252, by the orientation of the individual mounting bracket 252, by the selection of which of a plurality of mounting apertures 206 on the electrical box 200 are used to couple the electrical box 200 to the individual mounting bracket 252, or by combinations thereof. The mounting depth 290 may be selected to compensate for the thickness of coverings placed over the studs 910. As non-limiting examples, the mounting depth 290 may compensate for the thickness of wallboard and wall tiles that are placed over the studs 910 such that an electrical circuit component 900 coupled to the front of the electrical box 200 lies flush with a finished surface. As non-limiting examples, the electrical circuit component 900 may comprise a wall outlet or a wall switch. The electrical circuit component 900 may be covered by a cover plate 906.

Throughout this disclosure, the word 'stud' may refer to a wooden or metal support within a wall and may also refer to any support structure of a building to which electrical and plumbing supplies are attached. While the invention 100 is described in the context of being used on a wall, the invention 100 may be used on other surfaces. As non-limiting examples, the invention 100 may be used on a ceiling, a floor, a bulkhead, or a cabinet.

The electrical box 200 may comprise a left side 202, a right side 204, a top surface 216, a bottom surface 218, and a rear wall 220. The front of the electrical box 200 may be open such that the electrical circuit component 900 may couple to the front of the electrical box 200. The electrical box 200 is described here as if the electrical box 200 is oriented such that the electrical box 200 is taller (top to bottom) than the electrical box 200 is wide (left to right). However, the electrical box 200 is not limited to being mounted in this orientation and in fact may be mounted in any orientation.

The electrical box 200 may be an enclosure that shields electrical wiring located within the electrical box 200. The electrical box 200 may provide mechanical support for the electrical circuit component 900 that may couple to the front of the electrical box 200. As non-limiting examples, the electrical box 200 may be constructed from a rigid material such as metal or plastic.

The left side 202 and the right side 204 of the electrical box 200 may each comprise the plurality of mounting apertures 206 for coupling the electrical box 200 to the individual mounting bracket 252. The plurality of mounting apertures 206 may be arranged into a matrix that comprises two or more columns. An individual column of mounting apertures 224 may comprise the plurality of mounting apertures 206 that are aligned vertically and are located the same horizontal distance from the front of the electrical box 200. The individual mounting bracket 252 may be coupled to the electrical box 200 via one of the individual columns of mounting apertures 224.

As non-limiting examples, a first column of mounting apertures 210 may comprise the plurality of mounting apertures 206 that are vertically aligned and closest to the front of the electrical box 200. A second column of mounting apertures 212 may comprise the plurality of mounting apertures 206 that are vertically aligned and located farther away from the front of the electrical box 200 than the first column of mounting apertures 210. A third column of mounting apertures 214 may comprise the plurality of mounting apertures 206 that are vertically aligned and located farther away from the front of the electrical box 200 than both the first column of mounting apertures 210 and the second column of mounting apertures 212. In a preferred embodiment, the left side 202 and the right side 204 of the electrical box 200 may each comprise three of the individual columns of mounting apertures 224. In some embodiments, the horizontal spacing between the individual columns of mounting apertures 224 may be equal.

The electrical box 200 may comprise one or more knockouts 222 for the routing of the electrical wiring into the electrical box 200. The one or more knockouts 222 may prevent access to the interior of the electrical box 200 until the one or more knockouts 222 are removed from the electrical box 200. As a non-limiting example, the one or more knockouts 222 may be removed from the electrical box 200 by striking the one or more knockouts 222, by prying the one or more knockouts 222, by twisting the one or more knockouts 222, or by combinations thereof. The one or more knockouts 222 may be located on the top surface 216, the bottom surface 218, the rear wall 220, or combinations thereof.

A box height 238 and a box width 240 may match the dimensions of the electrical circuit component 900 such that the electrical circuit components 900 may be installed in the electrical box 200. The electrical box 200 may be sized to accept exactly one of the electrical circuit components 900 and may be referred to as a single gang box. In some embodiments, the box width 240 may be wider laterally such that the electrical box 200 accepts more than one of the electrical circuit components 900. As non-limiting examples, two of the electrical circuit components 900 may be coupled to the front of a double gang box and three of the electrical circuit components 900 of the electrical circuit components 900 may be coupled to the front a triple gang box. As non-limiting examples, standard dimensions for the electrical box 200 and the electrical circuit components 900 may be defined by a governmental standards organization, an industry standards organization, a manufacturer's organization, or an individual manufacturer. In some embodiments, the box height 238 may be 3 inches and the box width 240 may be 2 inches or multiples thereof.

The one or more mounting brackets may be armatures that are operable to couple the electrical box 200 to the stud 910. The one or more mounting brackets may comprise an L-bracket 254. The L-bracket 254 may comprise a first plurality of L-bracket apertures 256 and a second plurality of L-bracket apertures 258. The L-bracket 254 may have an L-shaped horizontal cross-sectional profile. The first plurality of L-bracket apertures 256 may be located on a first L-bracket leg 264. The first plurality of L-bracket apertures 256 may be aligned vertically at a spacing that matches the spacing of the individual column of mounting apertures 224 on the electrical box 200. The L-bracket 254 may be coupled to the electrical box 200 using box mounting hardware 286 to fasten the first plurality of L-bracket apertures 256 to the individual column of mounting apertures 224. The second plurality of L-bracket apertures 258 may be located on a second L-bracket leg 266. The L-bracket 254 may be coupled to the stud 910 using wall mounting hardware 288 to fasten the second plurality of L-bracket apertures 258 to the stud 910.

The one or more mounting brackets may comprise a U-bracket 270. The U-bracket 270 may comprise a first plurality of U-bracket apertures 272 and a second plurality of U-bracket apertures 274. The U-bracket 270 may have a U-shaped horizontal cross-sectional profile. The first plurality of U-bracket apertures 272 may be located on a first U-bracket leg 280. The first plurality of U-bracket apertures 272 may be aligned vertically at a spacing that matches the spacing of the individual column of mounting apertures 224 on the electrical box 200. The U-bracket 270 may be coupled to the electrical box 200 using the box mounting hardware 286 to fasten the first plurality of U-bracket apertures 272 to the individual column of mounting apertures 224. The second plurality of U-bracket apertures 274 may be located on a second U-bracket leg 282. The U-bracket 270 may be coupled to the stud 910 using the wall mounting hardware 288 to fasten the second plurality of U-bracket apertures 274 to the stud 910. The stud 910 may be interposed between the first U-bracket leg 280 and a third U-bracket leg 284.

Figure 5:
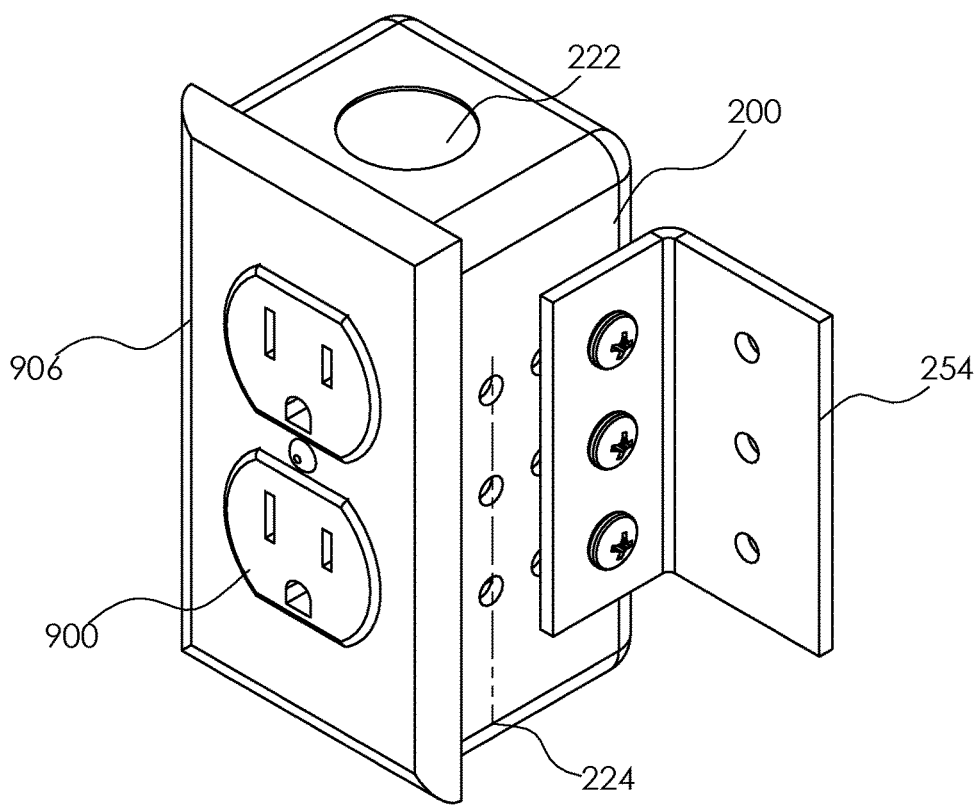
FIG. 5 is an isometric view of an embodiment of the disclosure illustrating a box with an L-bracket in a second orientation coupled to the third column of mounting apertures.
Figure 6:
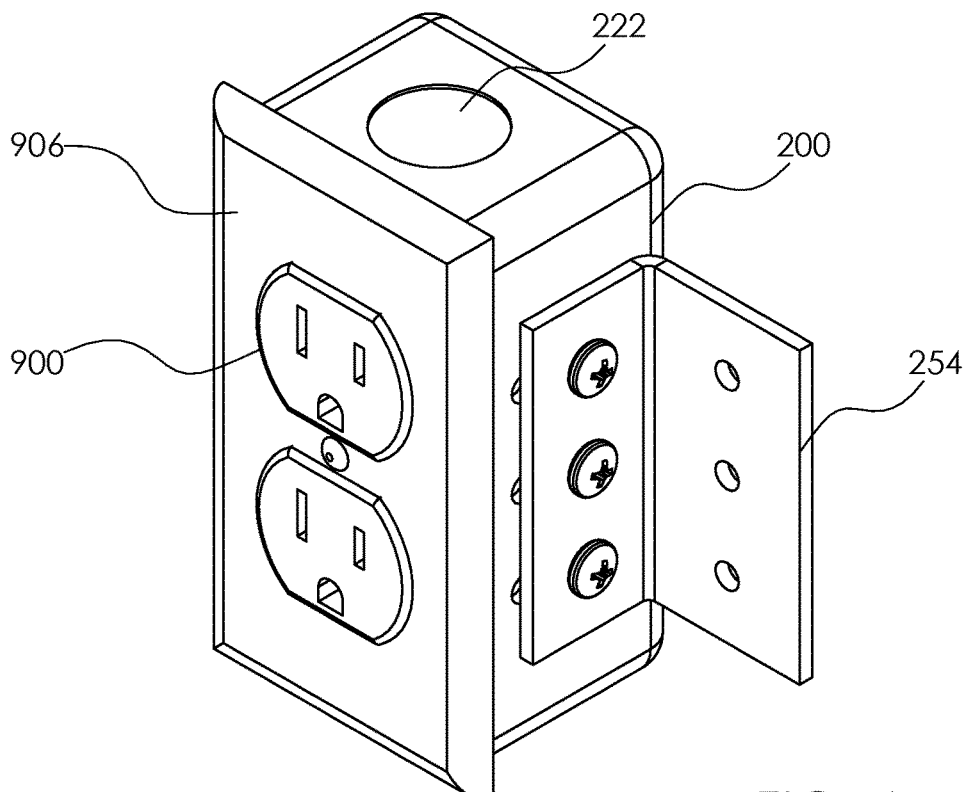
FIG. 6 is an isometric view of an embodiment of the disclosure illustrating a box with an L-bracket in a second orientation coupled to the second column of mounting apertures.
Figure 7:
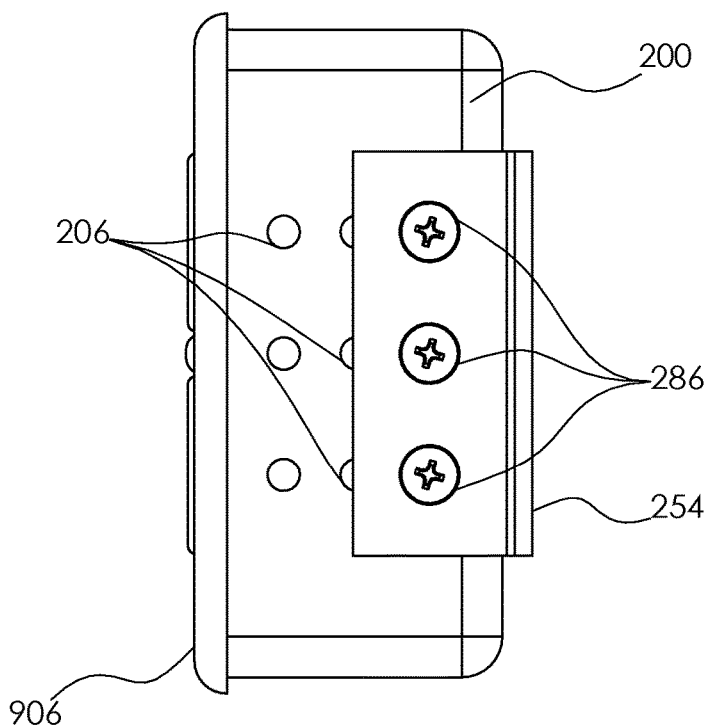
FIG. 7 is a side view of an embodiment of the disclosure illustrating a box with an L-bracket in a second orientation coupled to the third column of mounting apertures.
Figure 8:
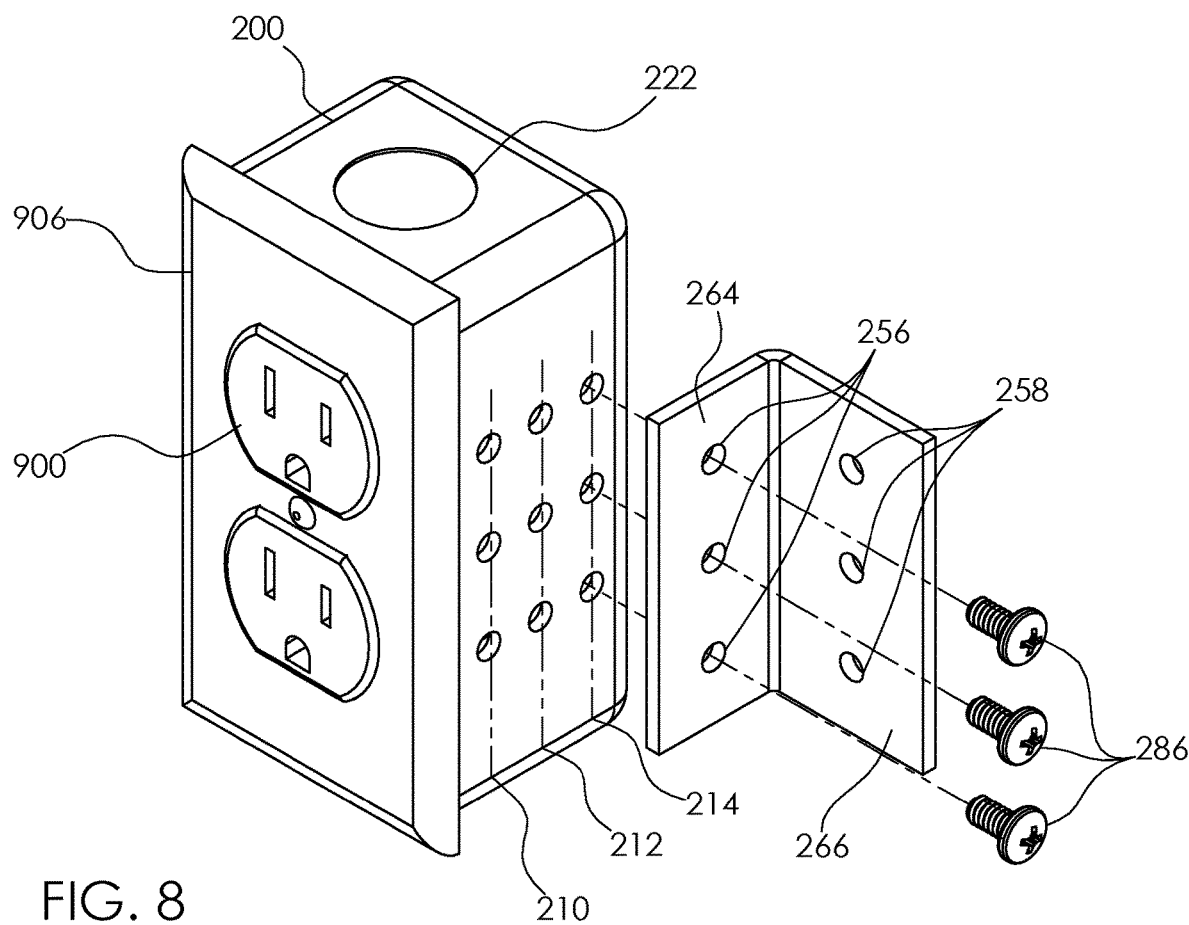
FIG. 8 is an exploded view of an embodiment of the disclosure illustrating a box with an L-bracket in a second orientation coupled to the third column of mounting apertures.
Figure 9:
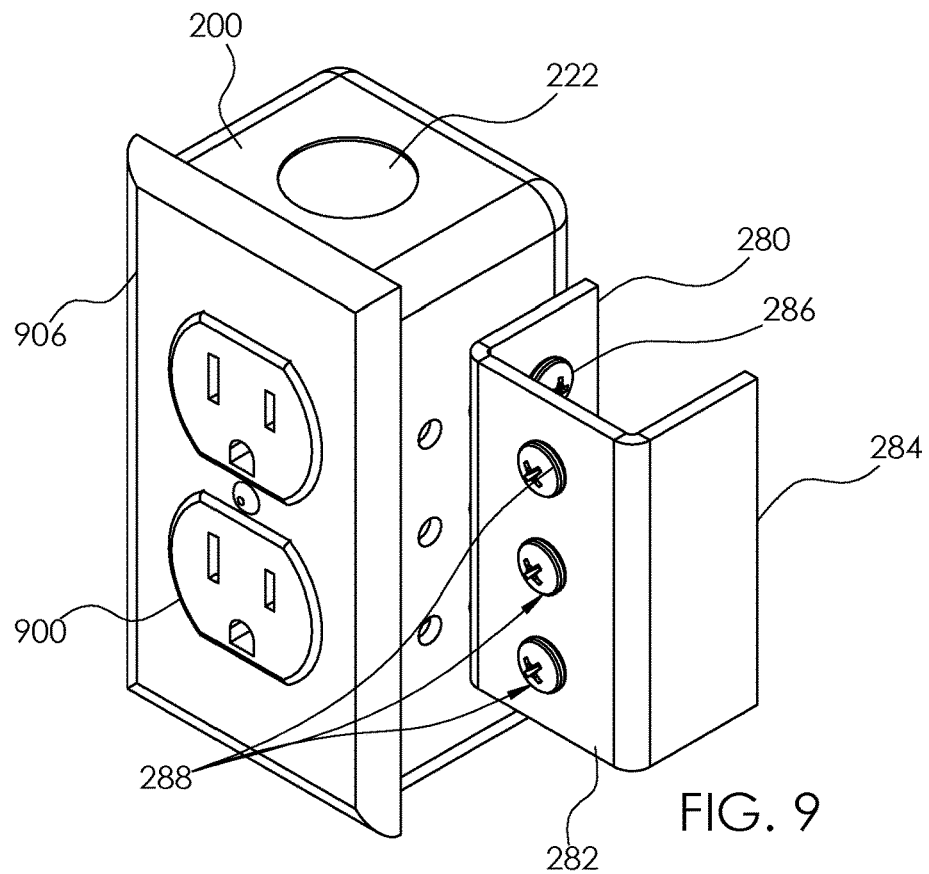
FIG. 9 is an isometric view of an embodiment of the disclosure illustrating a box with a U-bracket coupled to the third column of mounting apertures.
Figure 10:
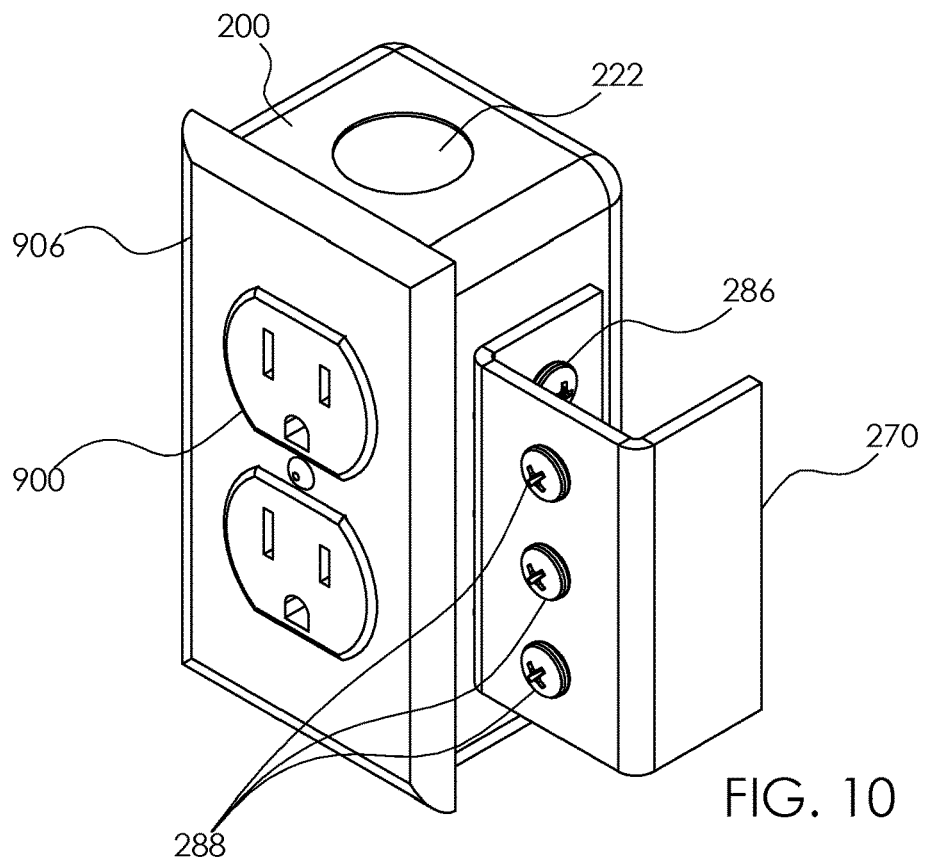
FIG. 10 is an isometric view of an embodiment of the disclosure illustrating a box with a U-bracket in a second orientation coupled to the second column of mounting apertures.
Figure 11:
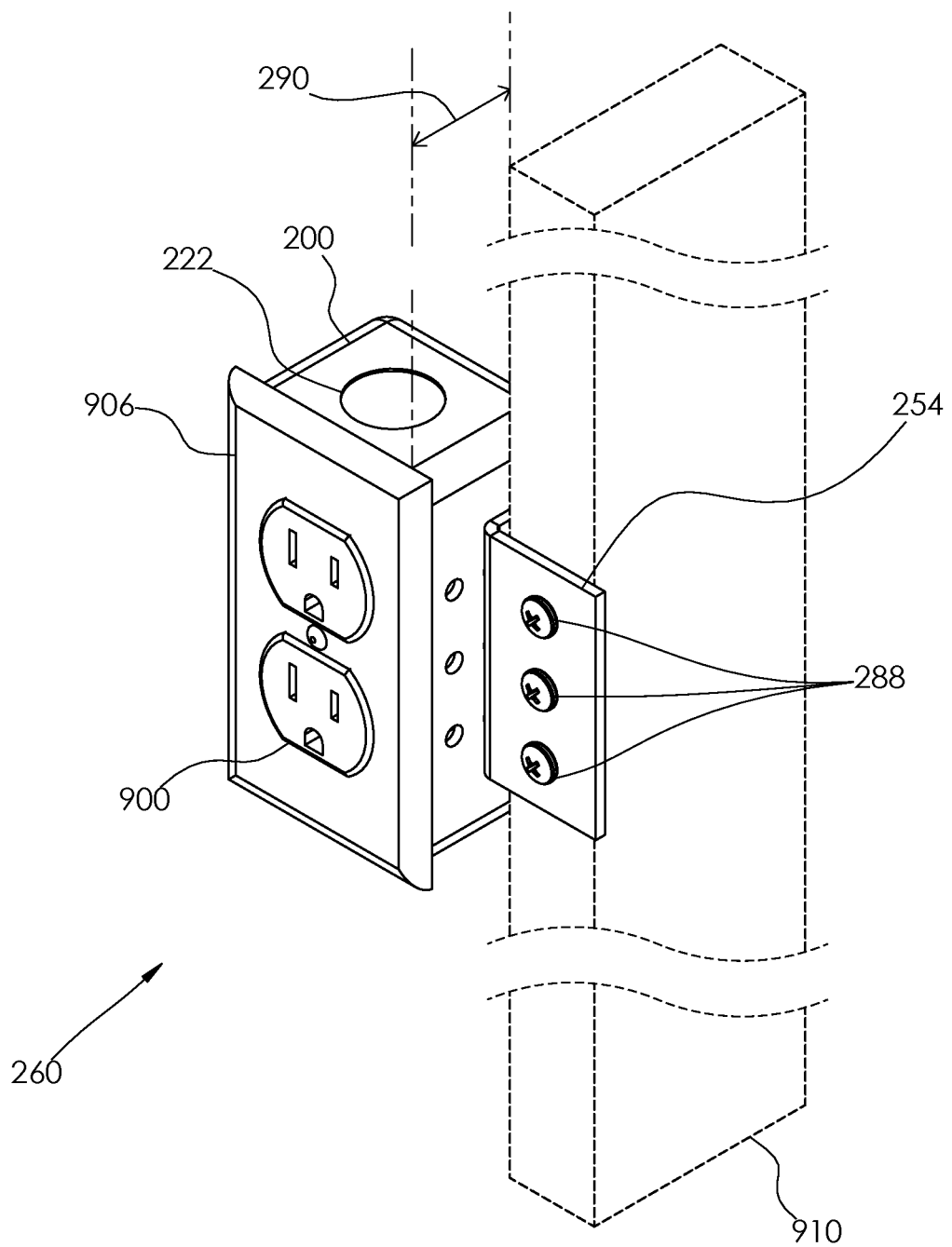
FIG. 11 is an in-use view of an embodiment of the disclosure illustrating a box with an L-bracket in a first orientation coupled a stud.
Figure 12:
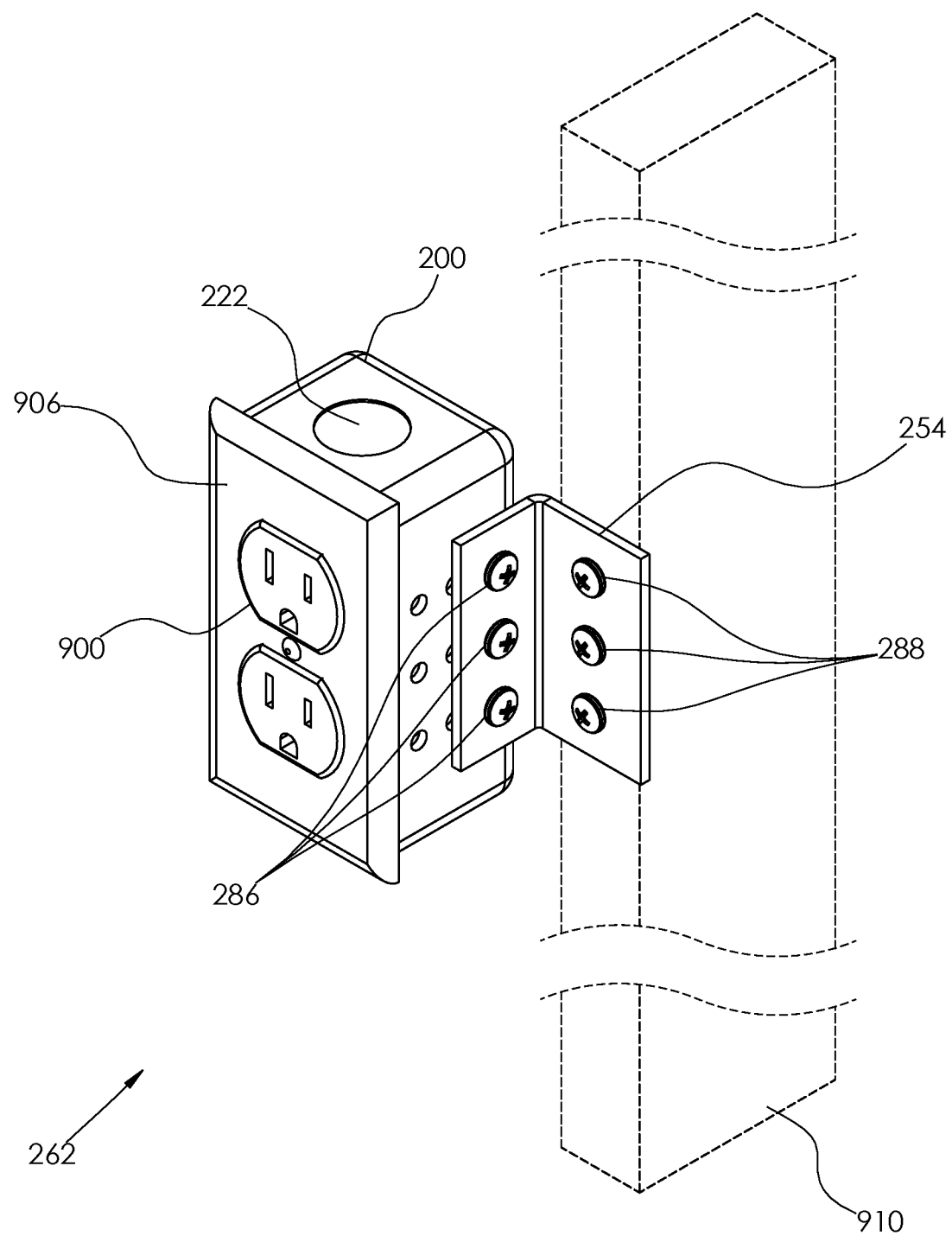
FIG. 12 is an in-use view of an embodiment of the disclosure illustrating a box with an L-bracket in a second orientation coupled a stud.
Figure 13:
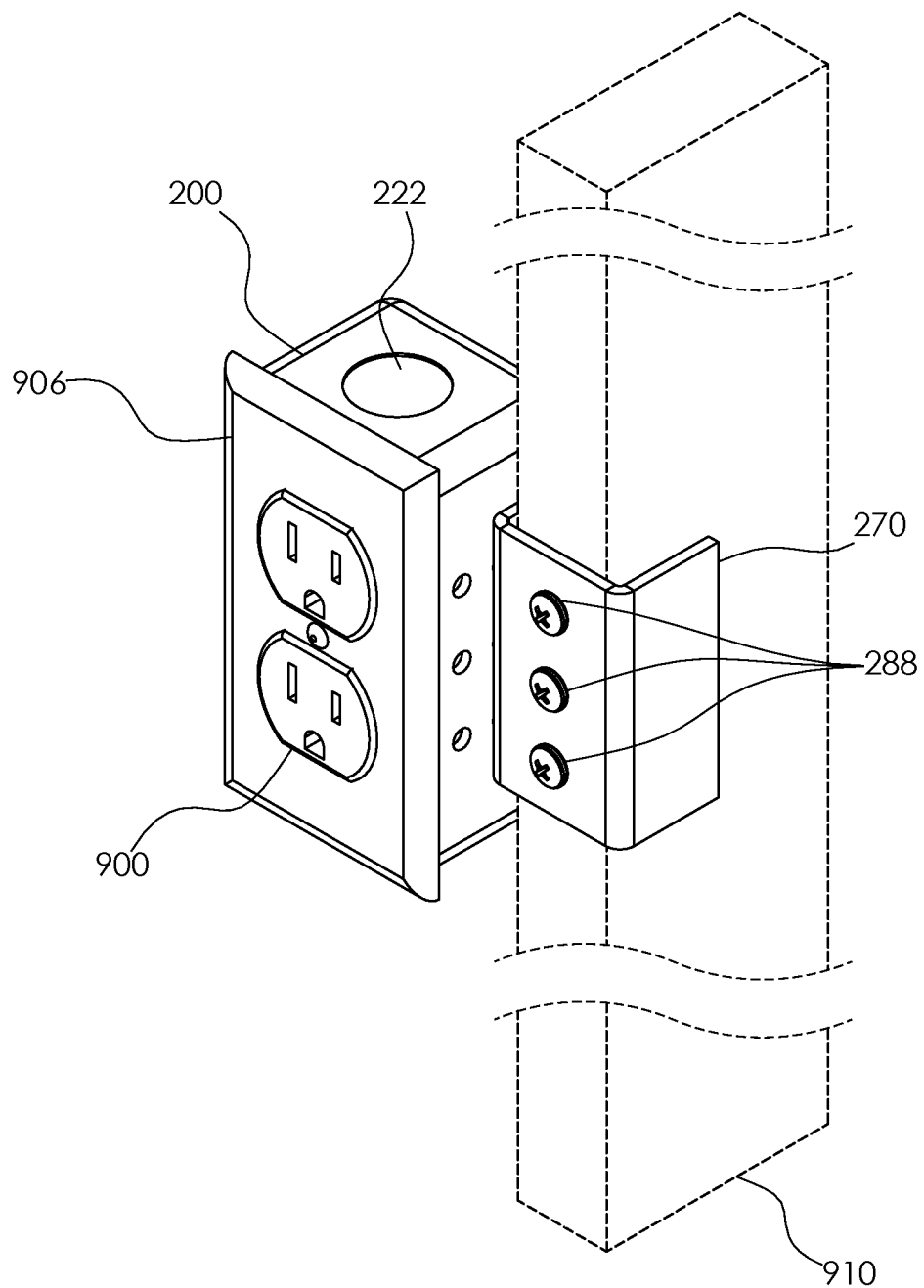
FIG. 13 is an in-use view of an embodiment of the disclosure illustrating a box with a U-bracket coupled a stud.
Figure 14:
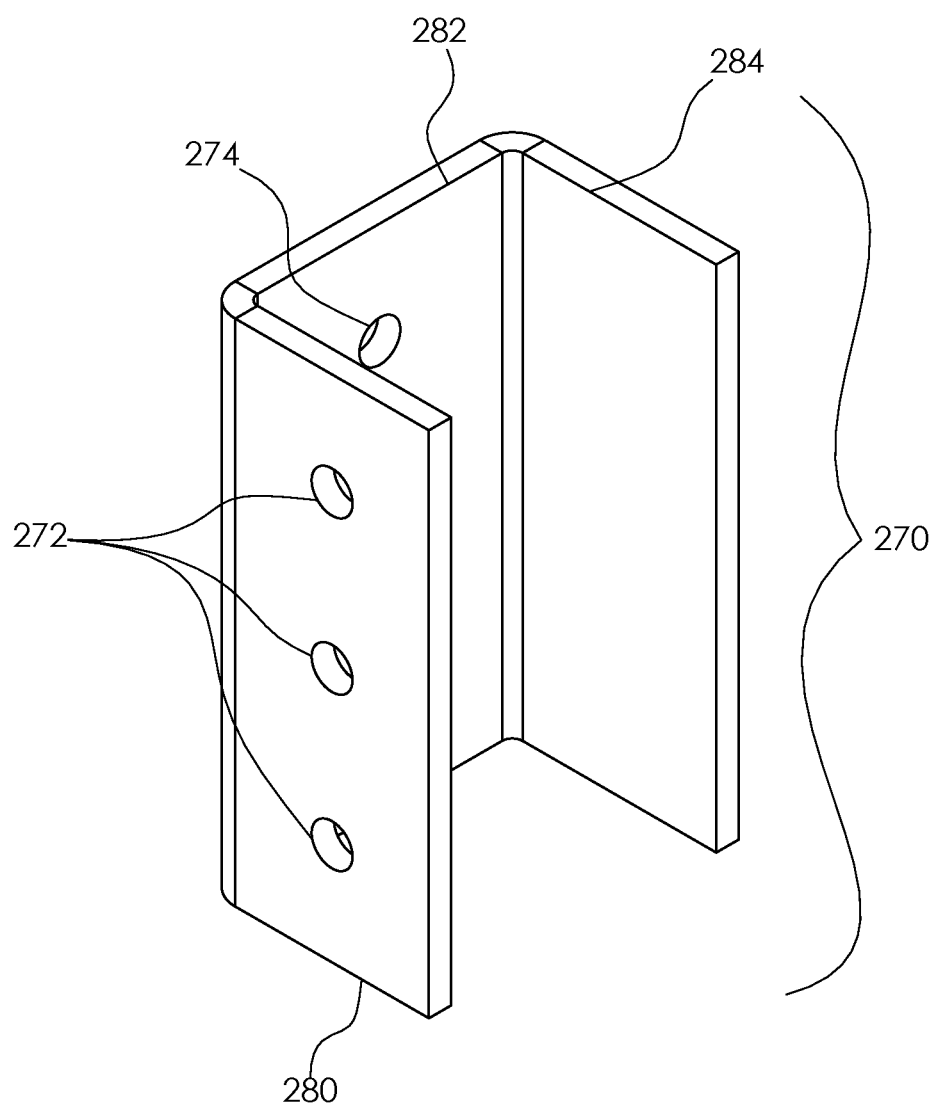
FIG. 14 is a detail view of an embodiment of the disclosure illustrating the U-bracket.

The mounting depth 290 of the electrical box 200 may be adjusted by selecting the orientation of the individual mounting bracket 252. As a non-limiting example, the L-bracket 254 may be coupled to the stud 910 in a first orientation 260 or in a second orientation 262. In the first orientation 260, the L-bracket 254 may be coupled to the stud 910 with the first L-bracket leg 264 extending towards the rear of the electrical box 200 as shown in FIG. 1. In the second orientation 262, the L-bracket 254 may be coupled to the stud 910 with the first L-bracket leg 264 extending towards the front of the electrical box 200 as shown in FIG. 5. The position of the first plurality of L-bracket apertures 256 moves horizontally towards the front when the L-bracket 254 is coupled to the stud 910 in the first orientation 260. The position of the first plurality of L-bracket apertures 256 moves horizontally towards the rear when the L-bracket 254 is coupled to the stud 910 in the second orientation 262. The repositioning of the first plurality of L-bracket apertures 256 based upon the orientation of the L-bracket 254 may change the mounting depth 290.

The mounting depth 290 of the electrical box 200 may be adjusted by selecting which of the individual columns of mounting apertures 224 on the electrical box 200 are coupled to the individual mounting bracket 252. Mounting the individual mounting bracket 252 to the electrical box 200 via the individual column of mounting apertures 224 that is closest to the front of the electrical box 200 may result in the deepest mounting depth. Mounting the individual mounting bracket 252 to the electrical box 200 via the individual columns of mounting apertures 224 that are farther from the front of the electrical box 200 may result in shallower mounting depth. Shallower mounting depth results from the electrical box 200 being moved towards the front.

In use, an individual mounting bracket 252 is selected for use. Measurements and calculations may determine which of one or more mounting brackets, which orientation of the individual mounting bracket 252, and which of individual columns of mounting apertures 224 on an electrical box 200 should be used to achieve the desired mounting depth. The individual mounting bracket 252 may be coupled to the electrical box 200 on a left side 202 or a right side 204 of the electrical box 200. If using an L-bracket 254, a first plurality of L-bracket apertures 256 on the L-bracket 254 may be coupled to the individual column of mounting apertures 224 on the electrical box 200 using box mounting hardware 286. If using a U-bracket 270, a first plurality of U-bracket apertures 272 on the U-bracket 270 may be coupled to the individual column of mounting apertures 224 on the electrical box 200 using the box mounting hardware 286. The individual mounting bracket 252 may be coupled to a stud 910 using wall mounting hardware 288. One or more knockouts 222 may be removed, wiring may run to the electrical box 200, and an electrical circuit component 900 may be wired and coupled to the front of the electrical box 200. Once wallboard, wall tiles, or other surface covering are in place, a cover plate 906 may be installed to cover the electrical circuit component 900. The back of the cover plate 906 may fit flush against the all due to the mounting depth established by the invention 100.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used herein, the word "desired" may refer to a specific value or action within a range of supported values or action. A "desired" value or action may indicate that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, the term "flush" may be used to describe that a first surface is aligned with a second surface.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "interior" may be used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used herein, the word "match" applied to dimensions or sizes may indicate a correlation between the size of a first object and a size of a second object. The correlation does not necessarily imply that the objects are equal size. As a non-limiting example, two objects that are sized differently such that one of the objects fits within the other object may be said to have matching dimensions. The correlation indicates that if the first object is made larger, then the second object must be made proportionally larger. Matching sizes may exclude overhangs, lips, edgings, trims, borders, mounts, or other features that enlarge the size of one or both objects but are unrelated to the intrinsic sizes of the objects.

As used herein, "mounting hardware" may refer to mechanical devices that are used to attach one object to another, including devices whose only purpose is to improve aesthetics. As non-limiting examples, mounting hardware may include screws, nuts, bolts, washers, rivets, crossbars, hooks, collars, nipples, standoffs, knobs, caps, plates, rails, and brackets.

As used in this disclosure, "orientation" may refer to the positioning and/or angular alignment of a first object relative to a second object or relative to a reference position or reference direction.

As used in this disclosure, an "outlet" may be a device placed in the electrical wiring system of a building where electrical current can be taken to run electrical devices. In this disclosure, an outlet is a socket adapted to receive a plug. In some embodiments, an outlet may find use in a vehicle or on equipment. As non-limiting examples, outlets may be used on recreational vehicles and on generators.

As used herein, "rigid" may refer to an object or material which is inflexible. If a force is applied to a rigid object the rigid object does not bend or deform unless the force applied reaches the breaking point of the rigid object.

As used in this disclosure, a "switch" may be an electrical device that starts and stops the flow of electricity through an electric circuit by completing or interrupting an electric circuit. The act of completing or interrupting the electrical circuit may be called actuation. Completing or interrupting an electric circuit with a switch is often referred to as closing or opening a switch, respectively. Completing or interrupting an electric circuit is also referred to as making or breaking the circuit, respectively.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 14, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A depth-adjusting electrical box comprising:
   an electrical box and one or more mounting brackets;
   wherein the electrical box is mounted to a stud via an individual mounting bracket selected from the one or more mounting brackets;
   wherein the electrical box is mounted at a mounting depth that is selected from a plurality of mounting depths;
   wherein the mounting depth is established by the selection of the individual mounting bracket, by the orientation of the individual mounting bracket, by the selection of which of a plurality of mounting apertures on the electrical box are used to couple the electrical box to the individual mounting bracket, or by combinations thereof;
   wherein the one or more mounting brackets comprise an L-bracket;
   wherein the L-bracket comprises a first plurality of L-bracket apertures and a second plurality of L-bracket apertures;
   wherein the L-bracket has an L-shaped horizontal cross-sectional profile;
   wherein the first plurality of L-bracket apertures are located on a first L-bracket leg;
   wherein the first plurality of L-bracket apertures are aligned vertically at a spacing that matches the spacing of the individual column of mounting apertures on the electrical box;
   wherein the L-bracket is coupled to the electrical box using box mounting hardware to fasten the first plurality of L-bracket apertures to the individual column of mounting apertures.

2. The depth-adjusting electrical box according to claim 1
   wherein the electrical box comprises a left side, a right side, a top surface, a bottom surface, and a rear wall;
   wherein the front of the electrical box is open such that an electrical circuit component couples to the front of the electrical box;
   wherein the electrical box is an enclosure that shields electrical wiring located within the electrical box;
   wherein the electrical box provides mechanical support for the electrical circuit component that couples to the front of the electrical box.

3. The depth-adjusting electrical box according to claim 2
   wherein the left side and the right side of the electrical box each comprise the plurality of mounting apertures for coupling the electrical box to the individual mounting bracket;
   wherein the plurality of mounting apertures are arranged into a matrix that comprises two or more columns.

4. The depth-adjusting electrical box according to claim 3
wherein an individual column of mounting apertures comprises the plurality of mounting apertures that are aligned vertically and are located the same horizontal distance from the front of the electrical box;
wherein the individual mounting bracket is coupled to the electrical box via one of the individual columns of mounting apertures.

5. The depth-adjusting electrical box according to claim 4
wherein the left side and the right side of the electrical box each comprise three of the individual columns of mounting apertures.

6. The depth-adjusting electrical box according to claim 4
wherein the horizontal spacing between the individual columns of mounting apertures are equal.

7. The depth-adjusting electrical box according to claim 4
wherein the electrical box comprises one or more knockouts for the routing of the electrical wiring into the electrical box;
wherein the one or more knockouts prevent access to the interior of the electrical box until the one or more knockouts are removed from the electrical box;
wherein the one or more knockouts are located on the top surface, the bottom surface, the rear wall, or combinations thereof.

8. The depth-adjusting electrical box according to claim 7
wherein a box height and a box width match the dimensions of the electrical circuit component such that the electrical circuit components are installed in the electrical box.

9. The depth-adjusting electrical box according to claim 8
wherein the electrical box is sized to accept exactly one of the electrical circuit components and is referred to as a single gang box.

10. The depth-adjusting electrical box according to claim 8
wherein the box width is wider laterally such that the electrical box accepts more than one of the electrical circuit components.

11. The depth-adjusting electrical box according to claim 10
wherein two of the electrical circuit components are coupled to the front of a double gang box and three of the electrical circuit components of the electrical circuit components are coupled to the front a triple gang box.

12. The depth-adjusting electrical box according to claim 8
wherein the box height is 3 inches and the box width is 2 inches or multiples thereof.

13. The depth-adjusting electrical box according to claim 8
wherein the one or more mounting brackets are armatures that are operable to couple the electrical box to the stud.

14. The depth-adjusting electrical box according to claim 13
wherein the second plurality of L-bracket apertures are located on a second L-bracket leg;
wherein the L-bracket is coupled to the stud using wall mounting hardware to fasten the second plurality of L-bracket apertures to the stud.

15. The depth-adjusting electrical box according to claim 14
wherein the L-bracket is coupled to the stud in a first orientation or in a second orientation;
wherein the position of the first plurality of L-bracket apertures moves horizontally towards the front when the L-bracket is coupled to the stud in the first orientation;
wherein the position of the first plurality of L-bracket apertures moves horizontally towards the rear when the L-bracket is coupled to the stud in the second orientation;
wherein the repositioning of the first plurality of L-bracket apertures based upon the orientation of the L-bracket changed the mounting depth.

16. The depth-adjusting electrical box according to claim 13
wherein the one or more mounting brackets comprise a U-bracket;
wherein the U-bracket comprises a first plurality of U-bracket apertures and a second plurality of U-bracket apertures;
wherein the U-bracket has a U-shaped horizontal cross-sectional profile;
wherein the first plurality of U-bracket apertures are located on a first U-bracket leg;
wherein the first plurality of U-bracket apertures are aligned vertically at a spacing that matches the spacing of the individual column of mounting apertures on the electrical box;
wherein the U-bracket is coupled to the electrical box using the box mounting hardware to fasten the first plurality of U-bracket apertures to the individual column of mounting apertures.

17. The depth-adjusting electrical box according to claim 16
wherein the second plurality of U-bracket apertures are located on a second U-bracket leg;
wherein the U-bracket is coupled to the stud using the wall mounting hardware to fasten the second plurality of U-bracket apertures to the stud.

18. The depth-adjusting electrical box according to claim 13 wherein mounting the individual mounting bracket to the electrical box via the individual column of mounting apertures that is closest to the front of the electrical box results in the deepest mounting depth and mounting the individual mounting bracket to the electrical box via the individual columns of mounting apertures that are farther from the front of the electrical box results in shallower mounting depth.

* * * * *